(12) United States Patent
Hirase et al.

(10) Patent No.: US 12,548,767 B2
(45) Date of Patent: Feb. 10, 2026

(54) BATTERY AND METHOD FOR MANUFACTURING SAME

(71) Applicant: Panasonic Intellectual Property Management Co., Ltd., Osaka (JP)

(72) Inventors: Masaki Hirase, Aichi (JP); Shuji Ito, Nara (JP); Seiji Nishiyama, Osaka (JP); Kunihiko Mineya, Osaka (JP); Tadaaki Matsumura, Shiga (JP); Yusuke Ito, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 570 days.

(21) Appl. No.: 18/058,598

(22) Filed: Nov. 23, 2022

(65) Prior Publication Data
US 2023/0080649 A1  Mar. 16, 2023

Related U.S. Application Data

(63) Continuation of application No. PCT/JP2021/014964, filed on Apr. 8, 2021.

(30) Foreign Application Priority Data

May 28, 2020 (JP) .................. 2020-093151

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0404* (2013.01); *H01M 4/0428* (2013.01);
(Continued)

(58) Field of Classification Search
None
See application file for complete search history.

(56) References Cited

U.S. PATENT DOCUMENTS

| | | | |
|---|---|---|---|
| 2006/0134518 A1* | 6/2006 | Kogetsu ............. | H01M 4/1391 427/58 |
| 2012/0107684 A1* | 5/2012 | Iwamoto ............. | H01M 4/134 427/78 |

(Continued)

FOREIGN PATENT DOCUMENTS

| | | |
|---|---|---|
| JP | 2004-171875 A | 6/2004 |
| JP | 2006-196447 A | 7/2006 |

(Continued)

OTHER PUBLICATIONS

International Search Report issued on Jun. 1, 2021 in International Patent Application No. PCT/JP2021/014964, with English translation.

(Continued)

*Primary Examiner* — Scott J. Chmielecki
(74) *Attorney, Agent, or Firm* — Rimon P.C.

(57) ABSTRACT

A battery of the present disclosure includes: a positive electrode; a negative electrode; and an electrolyte layer disposed between the positive electrode and the negative electrode, wherein the negative electrode includes a negative electrode current collector and a negative electrode active material layer, the negative electrode active material layer includes a plurality of silicon layers and a plurality of lithium silicate layers, and the silicon layer and the lithium silicate layer are alternately stacked.

9 Claims, 5 Drawing Sheets

(51) Int. Cl.
*H01M 4/04* (2006.01)
*H01M 4/38* (2006.01)
*H01M 4/485* (2010.01)

(52) U.S. Cl.
CPC ........... *H01M 4/386* (2013.01); *H01M 4/485* (2013.01); *H01M 2004/021* (2013.01); *H01M 2004/027* (2013.01)

(56) References Cited

U.S. PATENT DOCUMENTS

| | | | |
|---|---|---|---|
| 2012/0276305 A1* | 11/2012 | Hamalainen | C23C 16/08 427/126.1 |
| 2014/0099539 A1 | 4/2014 | Yamazaki et al. | |
| 2016/0020035 A1 | 1/2016 | Inoue et al. | |
| 2018/0175390 A1* | 6/2018 | Sun | H01M 4/386 |
| 2018/0175990 A1* | 6/2018 | Seok | H04L 1/00 |
| 2020/0083521 A1* | 3/2020 | Ito | H01M 4/60 |
| 2020/0112019 A1* | 4/2020 | Oh | H01M 4/485 |
| 2021/0151759 A1* | 5/2021 | Nishitani | H01M 4/386 |
| 2021/0313564 A1* | 10/2021 | Nambuya | H01M 4/134 |
| 2022/0069297 A1* | 3/2022 | Takahashi | H01M 10/0525 |
| 2022/0310985 A1* | 9/2022 | Park | H01M 4/386 |
| 2025/0079448 A1* | 3/2025 | Park | H01M 4/134 |

FOREIGN PATENT DOCUMENTS

| | | |
|---|---|---|
| JP | 2014-089949 A | 5/2014 |
| JP | 2016-029649 A | 3/2016 |
| JP | 2018-152161 A | 9/2018 |
| WO | 2011/132428 A1 | 10/2011 |

OTHER PUBLICATIONS

Chinese Search Report dated Mar. 26, 2025 issued in the corresponding Chinese Patent Application No. 202180034566.4, with English translation.

* cited by examiner

BATTERY AND METHOD FOR MANUFACTURING SAME

This application is a continuation of PCT/JP2021/014964 filed on Apr. 8, 2021, which claims foreign priority of Japanese Patent Application No. 2020-093151 filed on May 28, 2020, the entire contents of both of which are incorporated herein by reference.

BACKGROUND OF THE INVENTION

1. Field of the Invention

The present disclosure relates to a battery and a method for manufacturing the same.

2. Description of Related Art

Conventionally, graphite has been widely used as a negative electrode active material of lithium secondary batteries. The capacity of recent lithium secondary batteries is approaching the theoretical capacity per unit mass of graphite, 372 mAh/g. Therefore, it is difficult to further increase the capacity of lithium secondary batteries. To solve such a problem, studies have been actively conducted on negative electrode active materials having a higher capacity than graphite.

Negative electrode active materials alternative to graphite include materials such as silicon, germanium, and tin, all of which occlude lithium by forming an alloy with lithium. Among these, silicon is particularly regarded as promising because of its high theoretical capacity per unit mass, 4198 mAh/g.

However, such negative electrode active materials, which form an alloy with lithium, greatly change in volume along with occlusion and release of lithium. Consequently, in a lithium secondary battery including such a negative electrode active material that forms an alloy with lithium, the volume change of the negative electrode active material due to charge and discharge tends to cause a contact failure between a negative electrode active material layer and a negative electrode current collector. The occurrence of a contact failure between the negative electrode active material layer and the negative electrode current collector might shorten the charge and discharge cycle life of the battery.

JP 2016-29649 A describes, as an improvement for implementing a lithium secondary battery having a high capacity and excellent cycle characteristics, alternate stacking of silicon layers and silicon oxide layers.

SUMMARY OF THE INVENTION

In conventional arts, a battery having an excellent charge and discharge efficiency is desired. A negative electrode active material having a small capacity per unit mass can achieve a battery having a small volume change due to charge and discharge and an excellent charge and discharge efficiency. Since the capacity per unit mass of the negative electrode active material and the charge and discharge efficiency have a trade-off relationship, it is important to achieve a balance therebetween.

The present disclosure provides a battery including:
a positive electrode;
a negative electrode; and
an electrolyte layer disposed between the positive electrode and the negative electrode, wherein
the negative electrode includes a negative electrode current collector and a negative electrode active material layer,
the negative electrode active material layer includes a plurality of silicon layers and a plurality of lithium silicate layers, and
the silicon layer and the lithium silicate layer are alternately stacked.

According to the present disclosure, it is possible to provide a battery having an excellent balance between the capacity per unit mass of a negative electrode active material and the charge and discharge efficiency.

Figure 1:
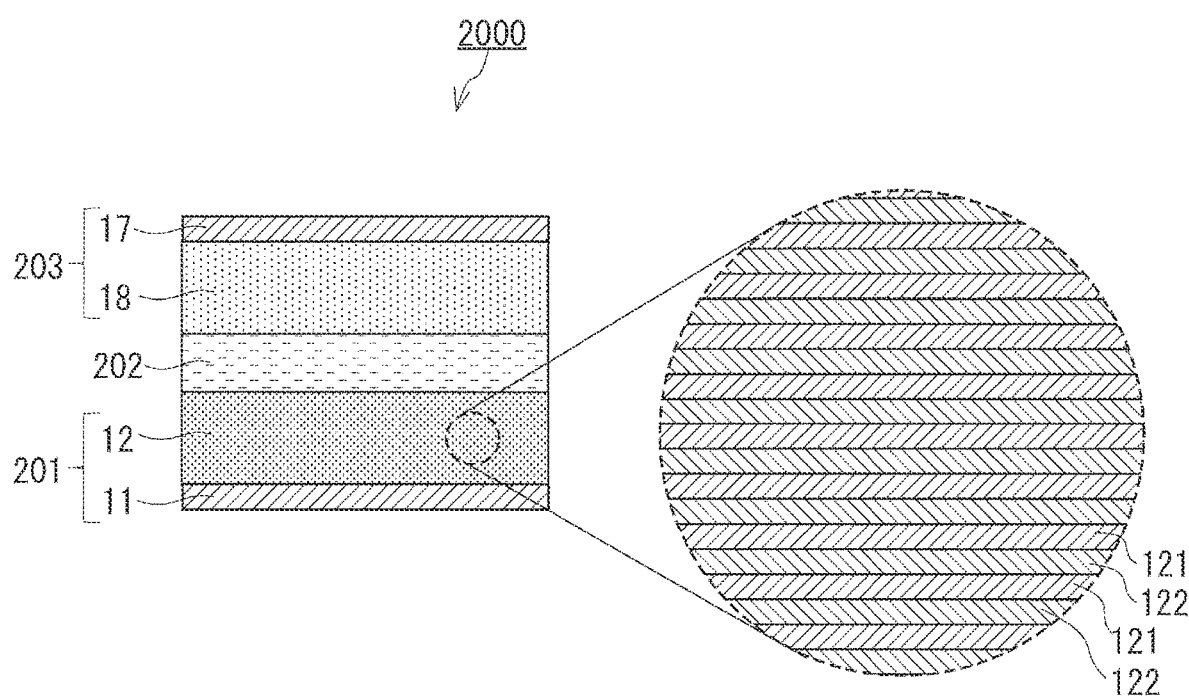
FIG. 1 is a cross-sectional view schematically showing the configuration of a battery of an embodiment.

DETAILED DESCRIPTION (Findings on which the Present Disclosure is Based)

A battery including silicon oxide as a negative electrode active material is inferior to a battery including graphite as a negative electrode active material in terms of charge and discharge efficiency in the initial charge and discharge. The main cause is that an irreversible reaction during charge and discharge changes silicon oxide ($SiO_x$, $0<x<2$) to a lithium silicate phase (main component: $Li_4SiO_4$). To suppress such an irreversible reaction to improve the initial charge and discharge efficiency, JP 2018-152161 A describes a negative electrode material containing: a $Li_4SiO_4$ crystal and a $Li_2SiO_3$ crystal; or a lithium silicide crystal.

It is considered that increasing the content of lithium silicate not only can improve the initial charge and discharge efficiency but also suppresses the volume change during charge and discharge to enhance the cycle characteristics. However, since lithium silicate does not involve charge and discharge, an excessive increase of lithium silicate decreases the capacity.

The present inventors considered that, by controlling the distribution of lithium silicate in a negative electrode active material layer, it may be possible to provide a battery having an excellent balance between the capacity per unit mass of a negative electrode active material and the charge and discharge efficiency. This led to the arrival to the present disclosure.

(Outline of One Aspect According to the Present Disclosure)

A battery according to a first aspect of the present disclosure includes:
a positive electrode;
a negative electrode; and
an electrolyte layer disposed between the positive electrode and the negative electrode, wherein
the negative electrode includes a negative electrode current collector and a negative electrode active material layer,
the negative electrode active material layer includes a plurality of silicon layers and a plurality of lithium silicate layers, and the silicon layer and the lithium silicate layer are alternately stacked.

According to such a configuration, it is possible to provide a battery having an excellent balance between the capacity per unit mass of a negative electrode active material and the charge and discharge efficiency.

In a second aspect of the present disclosure, for example, in the battery according to the first aspect, the silicon layer and the lithium silicate layer each may have a thickness of 3 nm or less.

In a third aspect of the present disclosure, for example, in the battery according to the second aspect, the silicon layer may have a thickness of 2 nm or less, and the lithium silicate layer may have a thickness of 1 nm or less.

By appropriately adjusting the thickness per layer of the silicon layer, the volume change of the negative electrode active material layer due to charge and discharge can be suppressed while the capacity of the negative electrode is sufficiently ensured. By appropriately adjusting the thickness per layer of the lithium silicate layer, the volume change of the negative electrode active material layer due to charge and discharge can be suppressed while the capacity of the negative electrode is sufficiently ensured.

In a fourth aspect of the present disclosure, for example, in the battery according to the second aspect, the lithium silicate layer may include a compound represented by $Li_{2z}SiO_{(2+z)}$, and $0<z\leq 2$ may be satisfied. Lithium silicate having an appropriate composition suppresses an irreversible reaction during charge and discharge, and thus the charge and discharge efficiency can be enhanced.

In a fifth aspect of the present disclosure, for example, in the battery according to the fourth aspect, the compound may be $Li_4SiO_4$. Lithium silicate having an appropriate composition suppresses an irreversible reaction during charge and discharge, and thus the charge and discharge efficiency can be enhanced.

In a sixth aspect of the present disclosure, for example, in the battery according to any one of the first to third aspects, the lithium silicate layer may include a compound represented by $Li_{(4-x)}SiO_4$, and $0<x\leq 2$ may be satisfied. Lithium silicate having an appropriate composition facilitates to provide a battery having an excellent balance between the capacity per unit mass of a negative electrode active material and the charge and discharge efficiency.

In a seventh aspect of the present disclosure, for example, in the battery according to the sixth aspect, the compound may be $Li_2SiO_4$. Lithium silicate having an appropriate composition suppresses an irreversible reaction during charge and discharge, and thus the charge and discharge efficiency can be enhanced.

In an eighth aspect of the present disclosure, for example, in the battery according to any one of the first to seventh aspects, the negative electrode active material layer may have a molar ratio of lithium, to silicon, of 0.05 or more and 0.25 or less. According to such a configuration, the above-described effects can be sufficiently achieved.

In a ninth aspect of the present disclosure, for example, in the battery according to any one of the first to eighth aspects, the negative electrode active material layer may have a molar ratio of oxygen, to silicon, of 0.1 or more and 0.3 or less. According to such a configuration, the above-described effects can be sufficiently achieved.

In a tenth aspect of the present disclosure, for example, in the battery according to any one of the first to ninth aspects, the electrolyte layer may include a solid electrolyte having lithium-ion conductivity. The technique of the present disclosure exerts sufficient effects in solid-state lithium batteries as well.

A battery manufacturing method according to an eleventh aspect of the present disclosure includes:

producing an electrode by alternately depositing silicon and lithium silicate on a current collector according to a vapor phase method; and assembling a battery by using the electrode.

According to the vapor phase method, thin silicon layers and thin lithium silicate layers can be consecutively and efficiently formed.

An embodiment of the present disclosure will be described below with reference to the drawings.

EMBODIMENT

FIG. 1 is a cross-sectional view schematically showing the configuration of a battery 2000 of the embodiment.

The battery 2000 of the embodiment includes a negative electrode 201, an electrolyte layer 202, and a positive electrode 203. The electrolyte layer 202 is disposed between the negative electrode 201 and the positive electrode 203. The negative electrode 201 occludes and releases lithium along with charge and discharge. The positive electrode 203 also occludes and releases lithium along with charge and discharge.

The negative electrode 201 includes a negative electrode current collector 11 and a negative electrode active material layer 12. The negative electrode current collector 11 and the negative electrode active material layer 12 are in contact with each other. The negative electrode active material layer 12 is disposed between the negative electrode current collector 11 and the electrolyte layer 202.

The negative electrode active material layer 12 includes a plurality of silicon layers 121 and a plurality of lithium silicate layers 122. In the negative electrode 201, the silicon layer 121 and the lithium silicate layer 122 are alternately stacked. According to such a configuration, while trading off with the capacity per unit mass of the negative electrode active material to some extent, a charge and discharge efficiency can be achieved which is equivalent to that in the case where the negative electrode active material layer is formed of only a silicon layer. In other words, it is possible to provide a battery having an excellent balance between the capacity per unit mass of a negative electrode active material and the charge and discharge efficiency.

The silicon layer 121 is a layer containing silicon as its main component. The term "main component" means a component contained in the largest amount in molar ratio. The silicon layer 121 contains oxygen and the like as inevitable impurities.

The lithium silicate layer 122 is a layer containing lithium silicate as its main component. The lithium silicate layer 122 may include a compound represented by $Li_{2z}SiO_{(2+z)}$. Here, $0<z\leq 2$ is satisfied. In the case where the lithium silicate has the stoichiometric composition, the compound is $Li_4SiO_4$. Lithium silicate having an appropriate composition suppresses an irreversible reaction during charge and discharge, and thus the charge and discharge efficiency can be enhanced.

The lithium silicate layer 122 may include a compound represented by $Li_{(4-x)}SiO_4$. Here, $0<x\leq 2$ is satisfied. Lithium silicate having an appropriate composition suppresses an irreversible reaction during charge and discharge, and thus the charge and discharge efficiency can be enhanced.

The negative electrode active material layer 12 may have a molar ratio of lithium, to silicon, of 0.05 or more and 0.25 or less. By appropriately adjusting the ratio of lithium to silicon, the above-described effects can be sufficiently achieved. In other words, while trading off with the capacity per unit mass of the negative electrode active material to some extent, the charge and discharge efficiency can be enhanced.

The negative electrode active material layer 12 may have a molar ratio of oxygen, to silicon, of 0.1 or more and 0.3 or less. By appropriately adjusting the ratio of oxygen to silicon, the above-described effects can be sufficiently achieved. In other words, while trading off with the capacity per unit mass of the negative electrode active material to some extent, the charge and discharge efficiency can be enhanced.

The silicon layer 121 and the lithium silicate layer 122 each have a thickness of, for example, 3 nm or less. By appropriately adjusting the thickness per layer of the silicon layer, the volume change of the negative electrode active material layer 12 due to charge and discharge can be suppressed while the capacity of the negative electrode 201 is sufficiently ensured. By appropriately adjusting the thickness per layer of the lithium silicate layer, the volume change of the negative electrode active material layer 12 due to charge and discharge can be suppressed while the capacity of the negative electrode 201 is sufficiently ensured. The silicon layer 121 may have a thickness of 2 nm or less. The lithium silicate layer 122 may have a thickness of 1 nm or less.

Next, a method for manufacturing the battery 2000 will be described. The battery 2000 is obtained by individually producing the negative electrode 201 and the positive electrode 203, and subsequently assembling the negative electrode 201, the electrolyte layer 202, and the positive electrode 203.

The negative electrode 201 is obtained by alternately depositing silicon and lithium silicate on the negative electrode current collector 11 by a vapor phase method. According to the vapor phase method, the thin silicon layers 121 and the thin lithium silicate layers 122 can be consecutively and efficiently formed.

Examples of the vapor phase method include a deposition method and a sputtering method. The film formation by the sputtering method can be performed with a sputtering apparatus 100 shown in FIG. 2.

Figure 2:
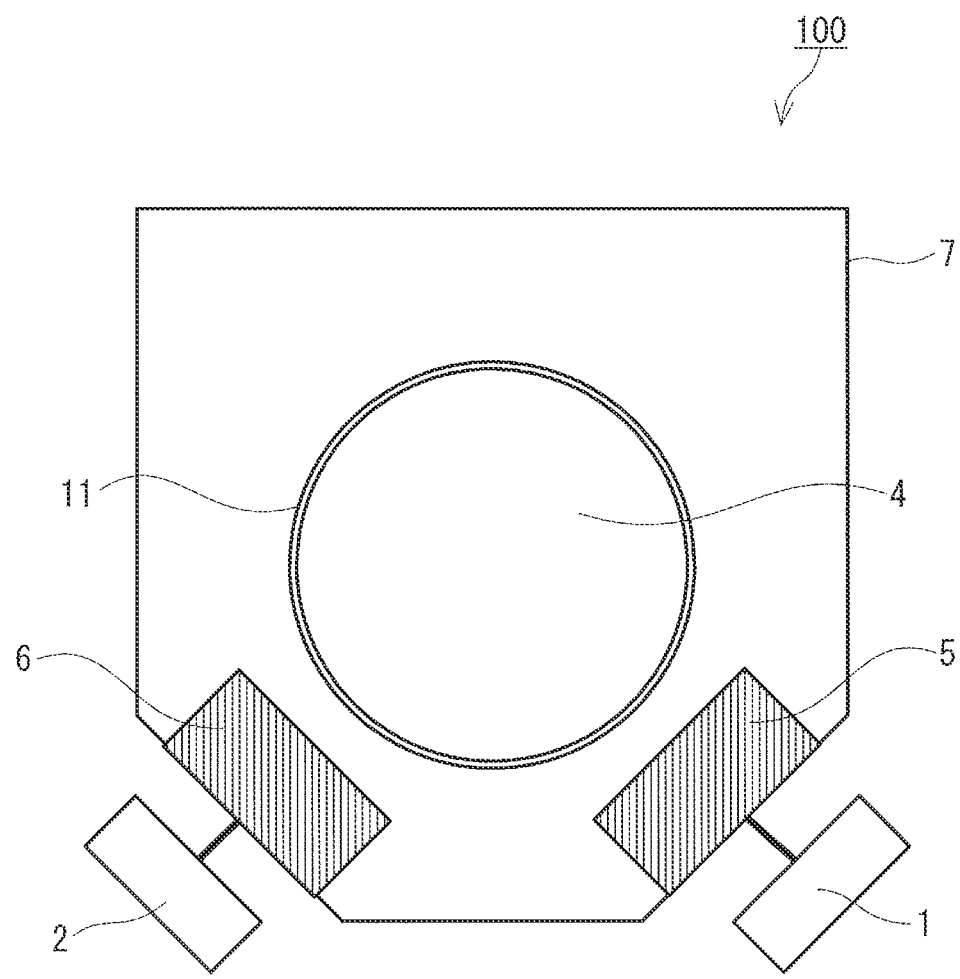
FIG. 2 is a configuration diagram of a sputtering apparatus.

FIG. 2 is a configuration diagram of the sputtering apparatus 100 that is usable in negative electrode manufacture. The sputtering apparatus 100 includes a DC pulsed power supply 1, an RF power supply 2, a rotary drum 4, a first target 5, a second target 6, and a vacuum chamber 7. The rotary drum 4, the first target 5, and the second target 6 are disposed inside the vacuum chamber 7.

Inside the vacuum chamber 7, the first target 5 and the second target 6 each face the rotary drum 4. Around the rotary drum 4, the first target 5 and the second target 6 are disposed at different angular positions. For example, the position of the first target 5 and the position of the second target 6 form an angle of 90 degrees to 180 degrees. In the first target 5, silicon is held as a target material. In the second target 6, lithium silicate ($Li_4SiO_4$) is held as a target material. The target material has a size of, for example, 100 mm×300 mm. To the first target 5, the DC pulsed power supply 1 is connected. To the second target 6, the RF power supply having a frequency of 13.56 MHz is connected.

The rotary drum 4 is rotatably supported inside the vacuum chamber 7. The negative electrode current collector 11 is wound around the outer circumferential surface of the rotary drum 4. The rotary drum 4 is, for example, a water-cooled rotary drum. While the rotary drum 4 is rotated, the first target 5 and the second target 6 are each energized to perform film formation by sputtering. Thus, the silicon layer 121 and the lithium silicate layer 122 are alternately formed on the negative electrode current collector 11.

According to the above configuration, the production of the negative electrode 201 includes conveyance of the negative electrode current collector 11, where the negative electrode current collector 11 is conveyed so as to alternately pass through a first deposition position for depositing silicon and a second deposition position for depositing lithium silicate. While the negative electrode current collector 11 is conveyed, lithium and lithium silicate are deposited on the negative electrode current collector 11 by a vapor phase method. The conveyance path for the negative electrode current collector 11 is a circulating path, and the first deposition position and the second deposition position are defined on the circulating path. According to such a configuration, it is possible to efficiently manufacture the negative electrode 201.

The thickness of the silicon layers 121 can be calculated from the deposition rate per rotation by the first target 5 and the rotational speed of the rotary drum 4. The thickness of the lithium silicate layers 122 can be calculated from the deposition rate per rotation by the second target 6 and the rotational speed of the rotary drum 4. The thickness of the lithium silicate layers 122 may be calculated by subtracting the thickness of the silicon layers 121 from the thickness of the negative electrode active material layer 12. The thickness of the negative electrode active material layer 12 can be measured by observing the cross section of the negative electrode active material layer 12 with an electron microscope. The thickness of each of the silicon layers 121 and the thickness of each of the lithium silicate layers 122 can also be measured by observing the cross section of the negative electrode active material layer 12 with an electron microscope. In the case where the thickness is measured with an electron microscope, the thickness may be the average of the measured values at any plural positions (e.g., any three positions). The thickness of the silicon layers 121 and the thickness of the lithium silicate layers 122 can be those measured in the discharge state. The discharge state means a state in which almost the total amount of lithium occluded by the negative electrode active material layer 12 along with charge has been released from the negative electrode active material layer 12.

The structure in which the silicon layer 121 and the lithium silicate layer 122 are alternately stacked can also be confirmed by observing the cross section of the negative electrode active material layer 12 with an electron microscope.

The negative electrode active material layer 12 may be composed of a plurality of columnar bodies extending in the thickness direction of the negative electrode current collector 11. The plurality of columnar bodies may be separated from each other. The plurality of columnar bodies each include a plurality of silicon layers 121 and a plurality of lithium silicate layers 122. According to such a configuration, it is possible to appropriately suppress expansion and contraction of the negative electrode active material layer 12 due to charge and discharge.

The electrolyte layer 202 may include a solid electrolyte having lithium-ion conductivity. The technique of the present disclosure exerts sufficient effects in solid-state lithium batteries as well.

As the solid electrolyte included in the electrolyte layer 202, an inorganic solid electrolyte having lithium-ion conductivity is used, for example. As the inorganic solid electrolyte, a sulfide solid electrolyte, an oxide solid electrolyte, a halide solid electrolyte, or the like is used.

As the solid electrolyte included in the electrolyte layer 202, a halide solid electrolyte may be used.

The halide solid electrolyte is represented by, for example, the following composition formula (1). In the composition formula (1), α, β, and γ are each independently a value greater than 0. The element M includes at least one element selected from the group consisting of a metalloid element and a metal element other than Li. The element X includes at least one selected from the group consisting of F, Cl, Br, and I.

$$Li_\alpha M_\beta X_\gamma \quad \text{Formula (1)}$$

Metalloid elements include B, Si, Ge, As, Sb, and Te. Metal elements include all the elements included in Groups 1 to 12 of the periodic table except for hydrogen and all the elements included in Groups 13 to 16 of the periodic table except for B, Si, Ge, As, Sb, Te, C, N, P, O, S, and Se. In other words, metal elements are a group of elements that can become cations when forming an inorganic compound with a halogen compound.

As the halide solid electrolyte, $Li_3YX_6$, $Li_2MgX_4$, $Li_2FeX_4$, $Li(Al, Ga, In)X_4$, $Li_3(Al, Ga, In)X_6$, or the like can be used.

According to the above configuration, it is possible to enhance the output density of the battery 2000. Furthermore, it is possible to enhance the thermal stability of the battery 2000 to suppress generation of a noxious gas such as hydrogen sulfide.

In the present disclosure, when an element in a formula is denoted as "(Al, Ga, In)", this notation represents at least one element selected from the group of elements in parentheses. In other words, "(Al, Ga, In)" is synonymous with "at least one selected from the group consisting of Al, Ga, and In". The same applies to other elements. The halide solid electrolyte exhibits an excellent ionic conductivity.

In the composition formula (1), M may include Y (=yttrium). In other words, the halide solid electrolyte included in the electrolyte layer 202 may include Y as a metal element.

The halide solid electrolyte including Y may be a compound represented by the following composition formula (2).

$$Li_a M_b Y_c X_6 \quad \text{Formula (2)}$$

The composition formula (2) satisfies a+mb+3c=6 and c>0. In the composition formula (2), M includes at least one element selected from the group consisting of a metalloid element and a metal element other than Li and Y. The symbol m represents the valence of M. The element X includes at least one selected from the group consisting of F, Cl, Br, and I. The element M includes at least one selected from the group consisting of Mg, Ca, Sr, Ba, Zn, Sc, Al, Ga, Bi, Zr, Hf, Ti, Sn, Ta, and Nb. Specific examples which can be used as the halide solid electrolyte including Y include $Li_3YF_6$, $Li_3YCl_6$, $Li_3YBr_6$, $Li_3YI_6$, $Li_3YBrCl_5$, $Li_3YBr_3Cl_3$, $Li_3YBr_5Cl$, $Li_3YBr_5I$, $Li_3YBr_3I_3$, $Li_3YBrI_5$, $Li_3YClI_5$, $Li_3YCl_3I_3$, $Li_3YCl_5I$, $Li_3YBr_2Cl_2I_2$, $Li_3YBrCl_4I$, $Li_{2.7}Y_{1.1}Cl_6$, $Li_{2.5}Y_{0.5}Zr_{0.5}Cl_6$, and $Li_{2.5}Y_{0.3}Zr_{0.7}Cl_6$.

According to the above configuration, it is possible to further enhance the output density of the battery 2000.

The solid electrolyte included in the electrolyte layer 202 may include a sulfide solid electrolyte.

According to the above configuration, since a sulfide solid electrolyte having an excellent reduction stability is included, a low-potential negative electrode material such as graphite or metallic lithium can be used, thereby enhancing the energy density of the battery 2000.

Examples which can be used as the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX, $Li_2O$, $MO_q$, $Li_pMO_q$, or the like may be added to these. Here, the element X in "LiX" is at least one element selected from the group consisting of F, Cl, Br, and I. The element M in "$MO_q$" and "$Li_pMO_q$" is at least one element selected from the group consisting of P, Si, Ge, B, Al, Ga, In, Fe, and Zn. The symbols p and q in "$MO_q$" and "$Li_pMO_q$" are each an independent natural number.

Examples which can be used as the sulfide-based solid electrolyte include lithium-containing sulfides such as those based on $Li_2S$—$P_2S_5$, $Li_2S$—$SiS_2$, $Li_2S$—$B_2S_3$, $Li_2S$—$GeS_2$, $Li_2S$—$SiS_2$—LiI, $Li_2S$—$SiS_2$—$Li_3PO_4$, $Li_2S$—$Ge_2S_2$, $Li_2S$—$GeS_2$—$P_2S_5$, and $Li_2S$—$GeS_2$—ZnS.

The solid electrolyte included in the electrolyte layer 202 may include at least one selected from the group consisting of an oxide solid electrolyte, a polymer solid electrolyte, and a complex hydride solid electrolyte.

Examples which can be used as the oxide solid electrolyte include: NASICON solid electrolytes typified by $LiTi_2(PO_4)_3$ and element-substituted substances thereof; (LaLi)$TiO_3$-based perovskite solid electrolytes; LISICON solid electrolytes typified by $Li_{14}ZnGe_4O_{16}$, $Li_4SiO_4$, and $LiGeO_4$ and element-substituted substances thereof; garnet solid electrolytes typified by $Li_7La_3Zr_2O_{12}$ and element-substituted substances thereof; $Li_3N$ and H-substituted substances thereof; $Li_3PO_4$ and N-substituted substances thereof; and glass and glass ceramics in which a material such as $Li_2SO_4$ or $Li_2CO_3$ has been added to a base material including a Li—B—O compound such as $LiBO_2$ or $Li_3BO_3$.

Examples which can be used as an oxide-based solid electrolyte include a lithium-containing metal oxide such as $Li_2O$—$SiO_2$ and $Li_2O$—$SiO_2$—$P_2O_5$, a lithium-containing metal nitride such as $Li_xP_yO_{1-z}N_z$, lithium phosphate ($Li_3PO_4$), and a lithium-containing transition metal oxide such as lithium titanium oxide.

Examples used as the oxide-based solid electrolyte include $Li_7La_3Zr_2O_{12}$(LLZ), $Li_{1.3}Al_{0.3}Ti_{1.7}(PO_4)_3$(LATP), and (La, Li)$TiO_3$(LLTO).

Examples which can be used as the polymer solid electrolyte include a compound of a polymer compound and a lithium salt. The polymer compound may have an ethylene oxide structure. Owing to having an ethylene oxide structure, the polymer compound can contain a large amount of lithium salt, thereby further increasing the ionic conductivity. Examples which can be used as the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, one lithium salt selected from these may be used alone, or a mixture of two or more lithium salts selected from these may be used.

As the complex hydride solid electrolyte, $LiBH_4$—LiI or $LiBH_4$—$P_2S_5$ can be used, for example.

The electrolyte layer 202 may include only one solid electrolyte selected from the group of the solid electrolytes described above, or may include two or more solid electrolytes selected from the group of the solid electrolytes described above. The plurality of solid electrolytes have different compositions. The electrolyte layer 202 may include, for example, a halide solid electrolyte and a sulfide solid electrolyte.

The thickness of the electrolyte layer 202 may be 1 μm or more and 300 μm or less. In the case where the thickness of the electrolyte layer 202 is 1 μm or more, the negative electrode 201 and the positive electrode 203 are less likely to be short-circuited. In the case where the thickness of the electrolyte layer 202 is 300 μm or less, the battery 2000 can operate at a high power.

The battery 2000 of the present embodiment may be not only a solid-state battery but also a battery including an electrolyte solution. In this case, a resin porous membrane, a gel electrolyte membrane, or the like can be used as the electrolyte layer 202.

The positive electrode 203 includes a positive electrode current collector 17 and a positive electrode active material layer 18. The positive electrode current collector 17 and the positive electrode active material layer 18 are in contact with each other. The positive electrode active material layer 18 is disposed between the positive electrode current collector 17 and the electrolyte layer 202. The positive electrode 203 contributes, as the counter electrode of the negative electrode 201, to the operations of the battery 2000.

The positive electrode 203 may include a material having properties of occluding and releasing metal ions (e.g., lithium ions), and includes, for example, a positive electrode active material. Examples which can be used as the positive electrode active material include a metal composite oxide, a transition metal fluoride, a polyanion material, a fluorinated polyanion material, a transition metal sulfide, a transition metal oxysulfide, and a transition metal oxynitride. In particular, in the case where the lithium-containing transition metal oxide is used as the positive electrode active material, it is possible to reduce the manufacturing cost and increase the average discharge voltage.

The metal composite oxide selected as the positive electrode active material included in the positive electrode 203 may include Li and at least one element selected from the group consisting of Mn, Co, Ni, and Al. Such materials include $Li(NiCoAl)O_2$, $Li(NiCoMn)O_2$, $LiCoO_2$, and the like. The positive electrode active material may be, for example, $Li(NiCoMn)O_2$.

The positive electrode 203 may include a solid electrolyte. According to the above configuration, the lithium-ion conductivity inside the positive electrode 203 can be increased, thereby enabling the battery 2000 to operate at a high power. As the solid electrolyte included in the positive electrode 203, the materials exemplified as the solid electrolyte included in the electrolyte layer 202 may be used.

The median diameter of particles of the active material included in the positive electrode 203 may be 0.1 μm or more and 100 μm or less. In the case where the median diameter of the particles of the active material is 0.1 μm or more, the particles of the active material and the solid electrolyte can form a favorable dispersion state. This enhances the charge capacity of the battery 2000. In the case where the median diameter of the particles of the active material is 100 μm or less, the diffusion rate of lithium in the particles of the active material is sufficiently ensured. This enables the battery 2000 to operate at a high power.

The median diameter of the particles of the active material may be larger than that of particles of the solid electrolyte. This enables formation of a favorable dispersion state of the active material and the solid electrolyte.

In the volume ratio "v: 100−v" of the active material to the solid electrolyte included in the positive electrode 203, $30 \leq v \leq 95$ may be satisfied. In the case where $30 \leq v$ is satisfied, the energy density of the battery 2000 is sufficiently ensured. Furthermore, in the case where $v \leq 95$ is satisfied, the battery 2000 can operate at a high power.

The thickness of the positive electrode 203 may be 10 μm or more and 500 μm or less. In the case where the thickness of the positive electrode 203 is 10 μm or more, the energy density of the battery 2000 is sufficiently ensured. In the case where the thickness of the positive electrode 203 is 500 μm or less, the battery 2000 can operate at a high power.

The negative electrode 201 and the positive electrode 203 each may include one or more solid electrolytes for the purpose of increasing the ionic conductivity. As the solid electrolyte, the materials exemplified as the solid electrolyte included in the electrolyte layer 202 may be used.

At least one of the negative electrode 201, the electrolyte layer 202, and the positive electrode 203 may contain a binder for the purpose of enhancing the adhesion between particles. The binder is used to enhance the binding properties of the materials of the electrodes. Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, carboxymethylcellulose, and ethyl cellulose. Furthermore, as the binder can be used a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Moreover, a mixture of two or more selected from these may be used as the binder. The binder may be a styrene ethylene butylene styrene block copolymer (SEBS), or may be maleic anhydride-modified hydrogenated SEBS.

At least one of the negative electrode 201 and the positive electrode 203 may contain a conductive additive for the purpose of increasing the electronic conductivity. Examples which can be used as the conductive additive include: graphites such as natural graphite and artificial graphite; carbon blacks such as acetylene black and Ketjenblack; conductive fibers such as a carbon fiber and a metal fiber; metal powders such as a fluorinated carbon powder and an aluminum powder; conductive whiskers such as a zinc oxide whisker and a potassium titanate whisker; conductive metal oxides such as titanium oxide; and conductive polymer compounds such as a polyaniline compound, a polypyrrole compound, and a polythiophene compound. Using a conductive carbon additive can seek cost reduction.

The battery 2000 of the embodiment can be configured as batteries having various shapes such as a coin type, a cylindrical type, a prismatic type, a sheet type, a button type, a flat type, or a stacked type.

EXAMPLES

The present disclosure will be described in detail below with reference to examples and comparative examples. The present disclosure is not limited to the following examples.
1. Production of Negative Electrode
(1) Negative Electrode Including Silicon Layer and Lithium Silicate Layer As a negative electrode current collector, a rolled foil of C7025 alloy was used which had a surface roughened by precipitating copper through an electrolytic process. The rolled foil had a thickness of 18 μm before the roughening. The rolled foil had a thickness of 28 μm after the roughening. The arithmetic average roughness Ra of the surface of the negative electrode current collector was measured with a laser microscope. Ra was 0.6 μm.

Using a rolled foil having a roughened surface as the negative electrode current collector increases the contact area between the negative electrode current collector and the negative electrode active material layer. This favorably maintains, during the charge and discharge cycle, the adhesion state between the negative electrode current collector and the negative electrode active material layer composed of a plurality of columnar bodies.

Silicon and lithium silicate were alternately deposited on the negative electrode current collector with the sputtering apparatus described with reference to FIG. 2. Thus, a negative electrode a1 and a negative electrode a2 were obtained. Only silicon was deposited on the negative electrode current collector to obtain a negative electrode b1.

The conditions for film formation of the negative electrode a1, the negative electrode a2, and the negative electrode b1 are shown below.

(Conditions for Film Formation by Sputtering)
Pressure: 0.2 Pa
Flow rate of argon gas: 70 sccm (Standard Cubic Centimeter per Minute)
Rotational speed of rotary drum: 10 rpm
Film formation time: 334 min
DC pulse frequency: 100 kHz
DC pulse width: 1856 ns
DC pulse power and RF power: three conditions shown in Table 1

TABLE 1

|  | DC pulse power (W) | RF power (W) | Thickness of active material layer (μm) | Active material amount (g/cm²) |
|---|---|---|---|---|
| Negative electrode a1 (Si + lithium silicate) | 1000 | 300 | 6.4 | 112 |
| Negative electrode a2 (Si + lithium silicate) | 1000 | 600 | 7.2 | 127 |
| Negative electrode b1 (Si) | 1000 | 0 | 6.0 | 100 |

Note:
Active material amount is value obtained by normalizing active material amount in negative electrode b1 as 100.

(2) Silicon Negative Electrodes Having Different Oxygen Contents

Figure 3:
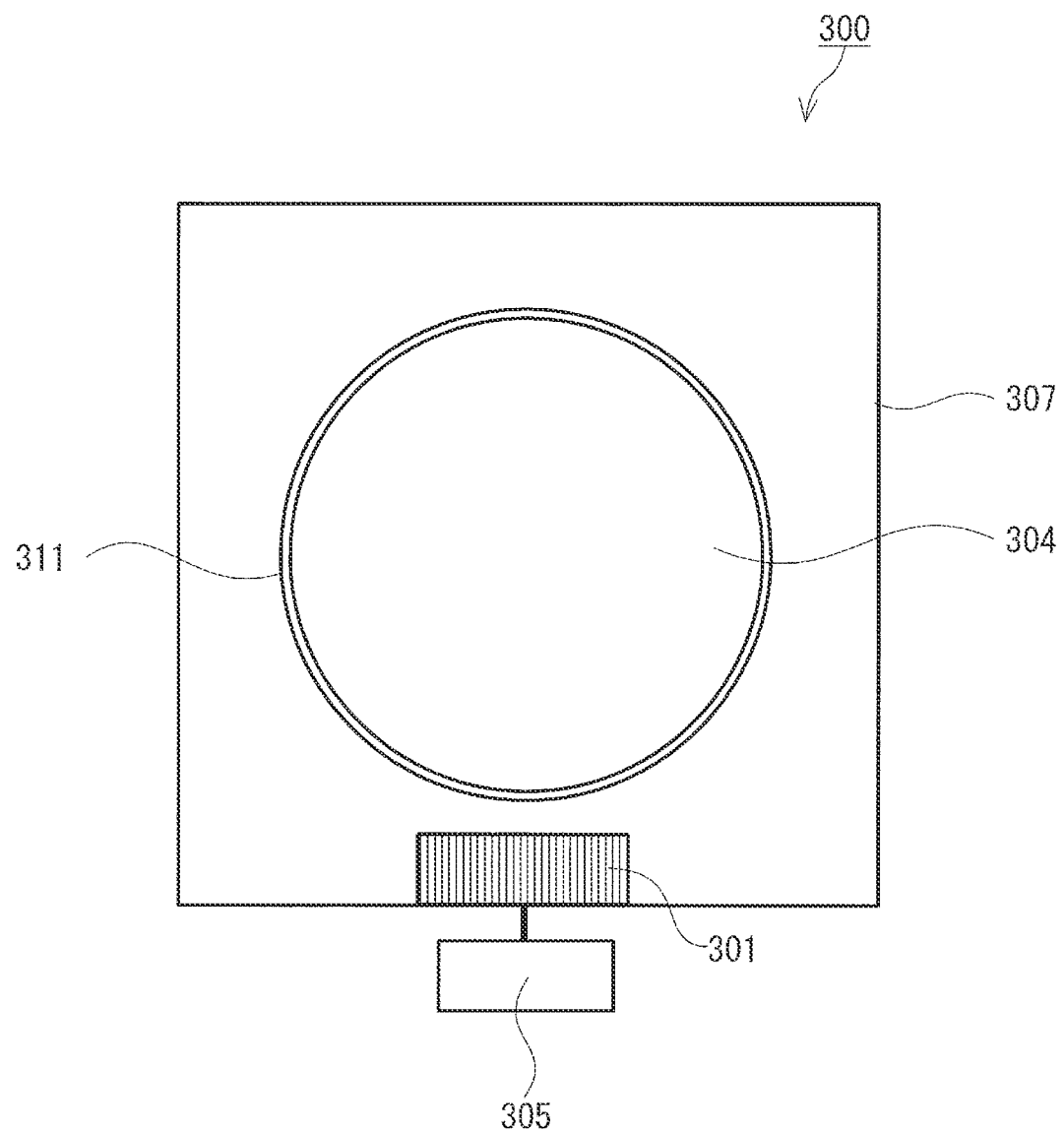
FIG. 3 is a configuration diagram of a sputtering apparatus used for producing the negative electrodes c1 to c5.

FIG. 3 is a configuration diagram of a sputtering apparatus 300 used for producing negative electrodes c1 to c5. With the sputtering apparatus 300 shown in FIG. 3, the negative electrodes c1 to c5 were produced, each of which included a silicon layer having a different oxygen content formed on a negative electrode current collector.

The sputtering apparatus 300 included a circular target 301, a DC pulsed power supply 305, a rotary drum 304, and a vacuum chamber 307. In the circular target 301, silicon was held as a target material. The DC pulsed power supply 305 was connected to the circular target 301. The rotary drum 304 was, for example, a water-cooled rotary drum having a diameter of 700 mm. A negative electrode current collector 311 was wound around the outer circumferential surface of the rotary drum 304.

Film formation by sputtering was performed while the rotary drum 304 was rotated, so that a silicon layer was formed on the negative electrode current collector 311. An oxygen gas was supplied into the vacuum chamber during the film formation. By changing the flow rate of the oxygen gas, the negative electrodes c1 to c5 of five types having different oxygen contents were produced. The conditions for film formation of the negative electrodes c1 to c5 are shown below.

(Conditions for Film Formation by Sputtering)
Pressure: 0.2 Pa
Rotational speed of rotary drum: 1.25 rpm
Film formation time: 380 min
DC pulse frequency: 100 kHz
DC pulse width: 1696 ns
DC pulse power: 2000 W
Flow rate of argon gas and flow rate of oxygen gas: five conditions shown in Table 2

TABLE 2

|  | Flow rate of argon gas (sccm) | Flow rate of oxygen gas (sccm) | Thickness of active material layer (μm) | Oxygen content (mass %) |
|---|---|---|---|---|
| Negative electrode c1 | 50 | 0 | 5.7 | 1 |
| Negative electrode c2 | 48 | 5 | 6.2 | 10 |
| Negative electrode c3 | 47 | 10 | 6.6 | 17 |
| Negative electrode c4 | 43 | 20 | 7.3 | 29 |
| Negative electrode c5 | 40 | 30 | 8.0 | 38 |

2. Evaluation of Negative Electrode Active Material (1) Thickness of Active Material Layer In producing each negative electrode, film formation of a negative electrode active material was performed also on a silicon wafer whose surface had been partially covered with a tape. Then, the tape was peeled off, and a step profiler was used to measure a step generated at the boundary between the region which had been covered with the tape and the region which had not been covered with the tape. Thus, the thickness of the negative electrode active material layer was measured. The thicknesses of the active material layers of the negative electrode a1, the negative electrode a2, and the negative electrode b1 are shown in Table 1. The thicknesses of the active material layers of the negative electrodes c1 to c5 are shown in Table 2.

In producing the negative electrode b1, the rotary drum of the sputtering apparatus rotated 3340 times during the film formation of the silicon layer. The thickness of the silicon layer formed per rotation of the rotary drum is 1.8 nm. It is considered that, in the negative electrode a1 and the negative electrode a2 as well, the silicon layer having the same thickness was formed per rotation of the rotary drum.

(2) Thickness and Composition of Lithium Silicate Layer

A lithium silicate layer was formed on a SUS foil with the sputtering apparatus shown in FIG. 1 under the following conditions. The RF power during the film formation was those in the two conditions for forming the lithium silicate layer in producing the negative electrode a1 and the negative electrode a2, namely, 300 W (condition 1) and 600 W (condition 2).

(Conditions for Film Formation by Sputtering)

Pressure: 0.2 Pa

Flow rate of argon gas: 70 sccm

Rotational speed of rotary drum: 10 rpm

Film formation time: 420 min

RF power: two conditions shown in Table 3

TABLE 3

|  | RF power (W) | Thickness (μm) | Molar ratio Li/Si | Molar ratio O/Si |
|---|---|---|---|---|
| Condition 1 | 300 | 0.6 | 2 | 4 |
| Condition 2 | 600 | 1.4 | 2 | 4 |

The thickness of the lithium silicate layer was measured by the same method as in the thickness measurement of the active material layer described above. The results are shown in Table 3.

During the film formation of the lithium silicate layer under the conditions 1 and 2, the rotary drum of the sputtering apparatus rotated 4200 times. The thickness of the lithium silicate layer formed per rotation of the rotary drum is 0.14 nm under the condition 1 and 0.33 nm under the condition 2.

The contents of lithium and silicon in the lithium silicate layer formed on the SUS foil were measured by ICP emission spectrometry (iCAP6300 manufactured by Thermo Fisher Scientific Inc.). The oxygen content in the lithium silicate layer formed on the SUS foil was measured by an inert gas fusion method (TC-436 AR manufactured by LECO Corporation). From the measurement results, the molar ratio of lithium to silicon (Li/Si) and the molar ratio of oxygen to silicon (O/Si) were calculated. The results are shown in Table 3. Both the lithium silicate layers formed under the conditions 1 and 2 had a composition in which approximately ½ of lithium was lost from the composition of the target material ($Li_4SiO_4$).

(3) Lithium Silicate Content and Oxygen Content in Active Material Layer

[Lithium Silicate Content]

The active material amounts per unit area in the negative electrode a1, the negative electrode a2, and the negative electrode b1 are shown in Table 1. The active material amount is the value obtained by normalizing the value for the negative electrode b1 as 100. The active material amount was determined by weighing the negative electrode and the current collector which were cut out to a certain size and calculating the mass difference between the negative electrode and the current collector.

When the negative electrode a1 and the negative electrode a2 are regarded to have the silicon layers whose amount is equal to that of the negative electrode b1, the lithium silicate contents in the negative electrode a1 and the negative electrode a2 are respectively 12 g/cm² and 27 g/cm² considering the values of the active material amount shown in Table 1. In other words, the lithium silicate contents in the negative electrode a1 and the negative electrode a2 are respectively 11 mass % and 21 mass % in the entire negative electrode active material layer. At this time, the molar ratio Li/Si and the molar ratio O/Si in the entire negative electrode active material layer of each of the negative electrode a1 and the negative electrode a2 can be estimated as follows from the values of the active material amount shown in Table 1.

Lithium silicate layer having composition $Li_4SiO_4$ (composition of target material)

(Negative electrode a1) ratio Li/Si:0.11, ratio O/Si:0.11

(Negative electrode a2) ratio Li/Si:0.24, ratio O/Si:0.24

Lithium silicate layer having composition $Li_2SiO_4$ (composition after film formation by sputtering)

(Negative electrode a1) ratio Li/Si:0.06, ratio O/Si:0.12

(Negative electrode a2) ratio Li/Si:0.13, ratio O/Si:0.27

[Oxygen Content]

The oxygen content in the silicon layer was measured for the negative electrodes b1 and the negative electrodes c1 to c5 by an inert gas fusion method (RO-600 manufactured by LECO Corporation). The measurement results for the negative electrodes c1 to c5 are shown in Table 2. The oxygen content in the silicon layer of the negative electrode b1 was 1 mass %.

3. Evaluation of Charge and Discharge Characteristics (1) Three-Electrode Battery

[Production of Battery]

Eight types of three-electrode batteries were produced by using the negative electrode a1, the negative electrode a2, the negative electrode b1, and the negative electrodes c1 to c5 as the working electrodes.

Figure 4:
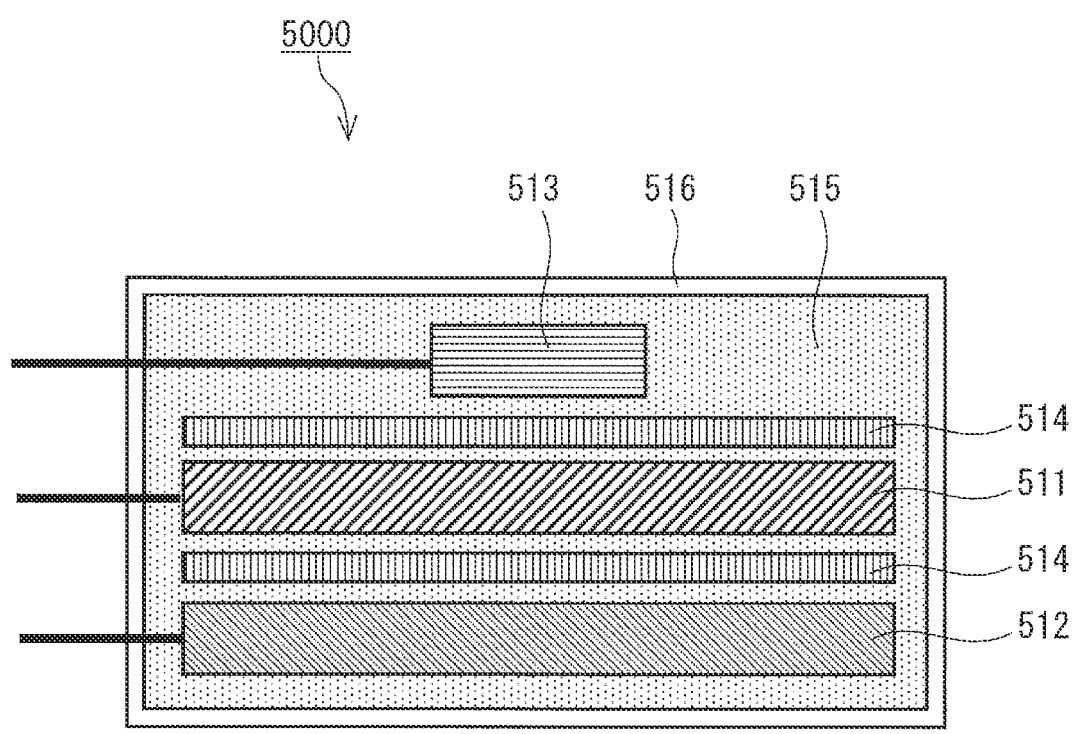
FIG. 4 is a cross-sectional view schematically showing the configuration of a three-electrode battery.

FIG. 4 is a cross-sectional view schematically showing the configuration of a three-electrode battery. As shown in FIG. 4, a three-electrode battery 5000 included a working electrode 511, a counter electrode 512, a reference electrode 513, two separators 514, an electrolyte solution 515, and a case 516. The working electrode 511, the counter electrode 512, and the reference electrode 513 were immersed in the electrolyte solution 515. The reference electrode 513, the working electrode 511, and the counter electrode 512 were arranged in this order. One of the two separators 514 was positioned between the working electrode 511 and the counter electrode 512. The other separator 514 was positioned between the working electrode 511 and the reference electrode 513. The case 516 housed the working electrode 511, the counter electrode 512, the reference electrode 513, the two separators 514, and the electrolyte solution 515.

The working electrode 511 was produced by the following method. First, the negative electrode was cut to have a size of 20 mm×20 mm. A lead wire was attached to this negative electrode and these were dried under vacuum at 110° C. for 2 hours. The lead wire was formed of nickel. Thus, the working electrode 511 was obtained.

Metallic lithium was used for the counter electrode 512 and the reference electrode 513. The separators 514 were formed of polyethylene. The electrolyte solution 515 included a mixed solvent of ethylene carbonate and ethyl methyl carbonate and included lithium hexafluorophosphate ($LiPF_6$). The volume ratio of ethylene carbonate to ethyl methyl carbonate in the mixed solvent was 3:7. The concentration of $LiPF_6$ in the electrolyte solution 515 was 1 mol/liter. The case 516 was formed of an aluminum laminated film.

[Charge and Discharge Test]

The three-electrode battery was charged at room temperature at a constant current of 0.2 mA/cm² until the potential of the working electrode with respect to the reference electrode reached 0 V, and then was discharged until the potential of the working electrode reached 2 V. Here, the reduction of the working electrode was defined as the charge, and the oxidation of the working electrode was defined as the discharge.

Table 4 shows the charge capacity and the charge and discharge efficiency of each battery. Charge capacity 1 is the charge capacity per unit area. Charge capacity 2 is the charge capacity per unit mass and is the value obtained by normalizing the value for the battery including the negative electrode b1 as 100. The charge and discharge efficiency is the value (%) obtained by dividing the discharge capacity by the charge capacity.

TABLE 4

|  | Negative electrode active material | Charge capacity 1 (mAh/cm$^2$) | Charge capacity 2 (mAh/g) | Charge and discharge efficiency (%) |
|---|---|---|---|---|
| Negative electrode a1 | Silicon + lithium silicate | 4.9 | 85 | 95 |
| Negative electrode a2 | Silicon + lithium silicate | 4.6 | 70 | 95 |
| Negative electrode b1 | Silicon | 5.1 | 100 | 96 |
| Negative electrode c1 | Silicon | 5.2 | 100 | 96 |
| Negative electrode c2 | Silicon + oxygen | 4.9 | 92 | 94 |
| Negative electrode c3 | Silicon + oxygen | 4.8 | 82 | 93 |
| Negative electrode c4 | Silicon + oxygen | 5.1 | 77 | 88 |
| Negative electrode c5 | Silicon + oxygen | 4.8 | 68 | 71 |

Note:
Charge capacity 2 is value obtained by normalizing charge capacity of negative electrode b1 as 100.

As shown in Table 4, the charge and discharge efficiencies of the respective batteries including the negative electrode a1 and the negative electrode a2 as the working electrode were higher than those of the respective batteries including the negative electrodes c2 to c5 as the working electrode. The charge and discharge efficiencies of the respective batteries including the negative electrode a1 and the negative electrode a2 as the working electrode were almost equivalent to those of the respective batteries including the negative electrode b1 and the negative electrode c1 as the working electrode.

Figure 5:
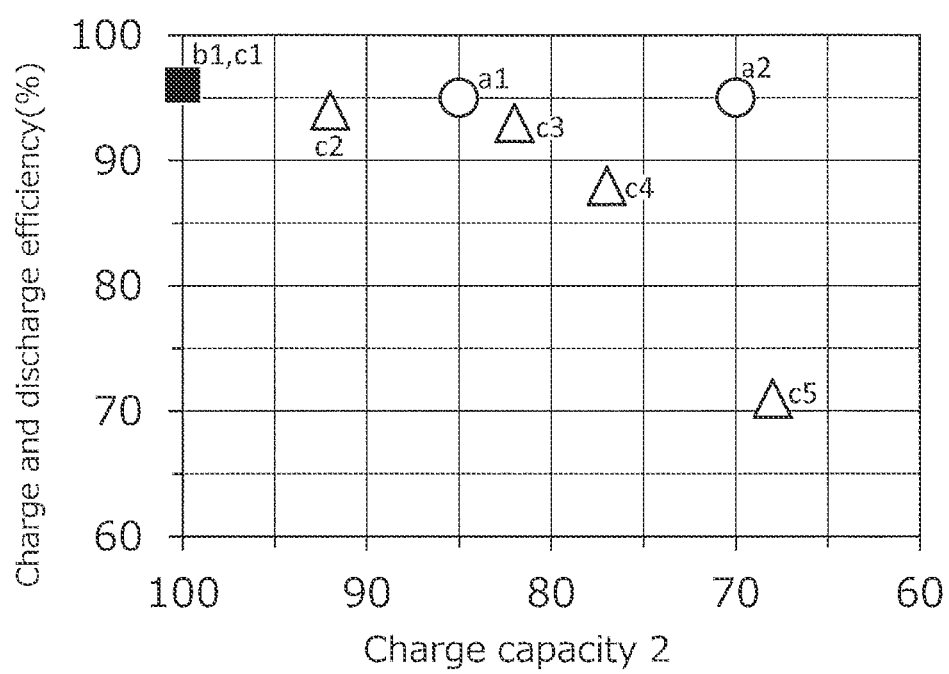
FIG. 5 is a graph corresponding to Table 4.

FIG. 5 is a graph corresponding to Table 4. The horizontal axis in FIG. 5 represents the charge capacity 2 in Table 4. The vertical axis in FIG. 5 represents the charge and discharge efficiency in Table 4. As shown in FIG. 5, the charge and discharge efficiencies of the respective batteries including the negative electrode c1 to the negative electrode c5 as the working electrode decreased along with the decrease in charge capacity, that is, along with the increase in oxygen ratio. In contrast, the charge and discharge efficiencies of the respective batteries including the negative electrode a1 and the negative electrode a2 as the working electrode were equivalent to those of the respective batteries including the negative electrode b1 and the negative electrode c1 as the working electrode irrespective of the decrease in charge capacity, that is, irrespective of the ratio of lithium silicate. This is evidence that the respective batteries including the negative electrode a1 and the negative electrode a2 as the working electrode have an excellent balance between the charge capacity (mAh/g) and the charge and discharge efficiency (%). A smaller charge capacity enables volume expansion during charge to be suppressed to be smaller. Therefore, according to the technique of the present disclosure, it is possible to, while suppressing a decrease in charge and discharge efficiency, adjust the addition ratio of lithium silicate to control the volume expansion of the negative electrode. A decrease in capacity density due to factors other than the addition of lithium silicate can also be suppressed.

(2) Production of all-Solid-State Battery Including Lithium-Indium Alloy as Counter Electrode Two types of all-solid-state batteries were produced, each of which included the negative electrodes a1 or a2 as the working electrode and included a solid electrolyte as the medium for conducting lithium ions.

[Production of Solid Electrolyte]

Li$_2$S and P$_2$S$_5$ were weighed in the molar ratio of Li$_2$S: P$_2$S$_5$=75:25, and pulverized and mixed in a mortar. Next, a mechanical milling process was performed at 510 rpm for 10 hours with a planetary ball mill. Thus, a glassy sulfide solid electrolyte was obtained.

[Production of Battery]

First, 80 mg of the solid electrolyte was weighed and put into an insulating cylinder. The insulating cylinder had an inner diameter portion with a cross-sectional area of 0.7 cm$^2$. The solid electrolyte inside the insulating cylinder was pressure-molded at 50 MPa. Next, the working electrode was punched out to have the same size as the inner diameter portion of the insulating cylinder. The working electrode was disposed on one surface of the solid electrolyte such that an active material layer of the working electrode was in contact with the solid electrolyte. Next, the working electrode and the solid electrolyte were pressure-molded at a pressure of 600 MPa to produce a stack composed of the working electrode and a solid electrolyte layer. Next, metallic indium, metallic lithium, and metallic indium were disposed in this order as the counter electrode on the solid electrolyte layer of the stack. The metallic indium had a thickness of 200 μm and an area of 0.66 cm$^2$. The metallic lithium had a thickness of 300 μm and an area of 0.58 cm$^2$. Thus, a stack was produced which had a three-layer structure of the working electrode, the solid electrolyte layer, and the indium-lithium-indium layer.

Next, both end surfaces of the stack having a three-layer structure were sandwiched with stainless steel pins. Furthermore, a confining pressure of 150 MPa was applied to the stack with bolts. Thus, all-solid-state batteries A1 and A2 were obtained which respectively had the negative electrodes a1 and a2 as the working electrode and had a lithium-indium alloy layer as the counter electrode.

[Charge and Discharge Test]

The batteries A1 and A2 were charged at room temperature at a constant current of 0.2 mA/cm$^2$ until the potential of the working electrode with respect to the counter electrode reached −0.615 V, and then were discharged until the potential reached 1.4 V.

The charge capacities and the charge and discharge efficiencies of the batteries A1 and A2 are shown in Table 5. Charge capacity 3 is the value obtained by normalizing, as 100, the capacity of the three-electrode battery including the negative electrode a1 or the negative electrode a2 as the working electrode (shown in Table 4).

TABLE 5

|  | Negative electrode | Charge capacity (mAh/cm$^2$) | Charge capacity 3 (mAh/g) | Charge and discharge efficiency (%) |
|---|---|---|---|---|
| Battery A1 | Negative electrode a1 | 4.9 | 107 | 94 |
| Battery A2 | Negative electrode a2 | 4.6 | 106 | 99 |

Note:
Charge capacity 3 is value obtained by normalizing value shown in Table 4 as 100

As shown in Table 5, the batteries A1 and A2 exhibited charge capacities and charge and discharge efficiencies equivalent to those of the three-electrode batteries including an electrolyte solution.

As described above, the negative electrode a1 and the negative electrode a2 were able to achieve excellent (initial) charge and discharge efficiencies and had high capacities per unit mass as well.

INDUSTRIAL APPLICABILITY

The battery of the present disclosure can be utilized, for example, as an all-solid-state secondary battery.

What is claimed is:

1. A battery comprising:
a positive electrode;
a negative electrode; and
an electrolyte layer disposed between the positive electrode and the negative electrode, wherein:
the negative electrode comprises a negative electrode current collector and a negative electrode active material layer,
the negative electrode active material layer comprises a plurality of silicon layers and a plurality of lithium silicate layers, which are alternately stacked,
a molar ratio of lithium to silicon in the negative electrode active material layer as a whole is 0.05 or more and 0.25 or less, and
a molar ratio of oxygen to silicon in the negative electrode active material layer as a whole is 0.1 or more and 0.3 or less.

2. The battery according to claim 1, wherein
each of the plurality of silicon layers and each of the plurality of lithium silicate layers have a thickness of 3 nm or less.

3. The battery according to claim 2, wherein
each of the plurality of silicon layers has a thickness of 2 nm or less, and
each of the plurality of lithium silicate layers has a thickness of 1 nm or less.

4. The battery according to claim 1, wherein the plurality of lithium silicate layers comprise a compound represented by $Li_{2z}SiO_{(2+z)}$, and
$0<z\leq2$ is satisfied.

5. The battery according to claim 4, wherein
the compound is $Li_4SiO_4$.

6. The battery according to claim 1, wherein
the plurality of lithium silicate layers comprise a compound represented by $Li_{(4-x)}SiO_4$, and
$0<x\leq2$ is satisfied.

7. The battery according to claim 6, wherein
the compound is $Li_2SiO_4$.

8. The battery according to claim 1, wherein
the electrolyte layer comprises a solid electrolyte having lithium-ion conductivity.

9. A battery manufacturing method comprising:
producing an electrode comprising a negative electrode active material layer including a plurality of silicon layers and a plurality of lithium silicate layers, which are alternately stacked, by alternately depositing silicon and lithium silicate on a current collector according to a vapor phase method; and
assembling a battery by using the electrode, wherein:
a molar ratio of lithium to silicon in the negative electrode active material layer as a whole is 0.05 or more and 0.25 or less, and
a molar ratio of oxygen to silicon in the negative electrode active material layer as a whole is 0.1 or more and 0.3 or less.

* * * * *